United States Patent [19]

Houng

[11] Patent Number: 4,472,607
[45] Date of Patent: Sep. 18, 1984

[54] INFLIGHT HEADSET FOR CIVIL AIRCRAFT

[76] Inventor: Huang-Kiang Houng, No. 138, Chung-Hsing St., Kaohsiung City, Taiwan

[21] Appl. No.: 544,267

[22] Filed: Oct. 21, 1983

[51] Int. Cl.³ .............................................. H04M 1/05
[52] U.S. Cl. ............................. 179/156 R; 179/182 A
[58] Field of Search ............... 179/156 R, 156 A, 178, 179/182 R, 182 A; 2/209

[56] References Cited

U.S. PATENT DOCUMENTS

| 4,065,645 | 12/1977 | Warner et al. | 179/156 R |
| 4,309,575 | 1/1982 | Zweig | 179/156 R |
| 4,404,434 | 9/1983 | Pelt et al. | 179/156 R |

Primary Examiner—A. D. Pellinen
Assistant Examiner—Danita R. Byrd

[57] ABSTRACT

The present invention relates to an inflight headset for civil aircraft and in particular to one comprising a pair of main body portions each having an adjusting rod, a pair of covers each connected to one of said main body portions, a headband having a collar at each end, the collar being closely fitted into said adjusting rod in such a way that the adjusting rod may be regulated in height with respect to the collar, the headband further having a projection along its length, the projection being associated with the protuberance in such a manner that the adjusting rod may be rotated with respect to the perpendicular plane along the length of the headband, a pair of ear cushions each connected with one of the main body portions, and a pair of acoustic pipes each connected to one of the main body portions.

6 Claims, 10 Drawing Figures

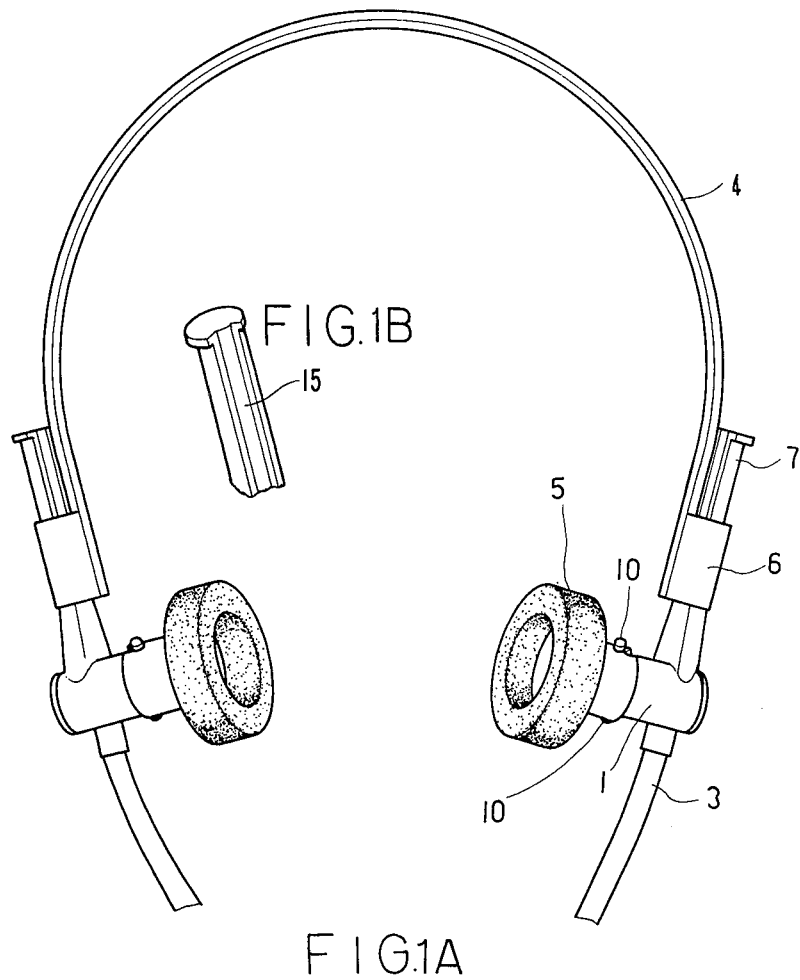
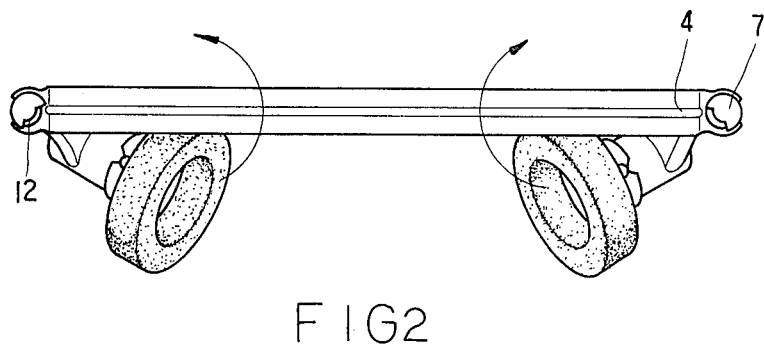

INFLIGHT HEADSET FOR CIVIL AIRCRAFT

BACKGROUND OF THE INVENTION

Headsets of the type referred to are well known in the prior art; nevertheless, the prior art inflight headset for civil aircraft have the following drawbacks:

1. The ear cushions can be adjusted in height but cannot be rotated with respect to the perpendicular plane along the length of the headband. Since the ears of everybody are positioned differently, the headphones cannot satisfactorily adapt to the needs of everybody.

2. Each earpiece of the headphones, which is made of flexible plastics, is in the shape of a mushroom. Each of the earpieces is inserted into a helicotrema of an ear of an user so that the user will certainly feel uncomfortable after having worn a short time.

3. The sound wave must pass an abrupt turn before entering into the ear cushions, thus resulting in much distortion.

SUMMARY

It is a primary object of the present invention to provide an inflight headset for civil aircraft which is possessed of a very smooth passage served to faithfully transmit sound waves.

It is another object of the present invention to provide an inflight headset for civil aircraft which may be equipped with ear cushions of different sizes.

It is still another object of the present invention to provide an inflight headset for civil aircraft of which the ear cushions can be adjusted in height with respect to the headband by means of two collars positioned at the ends of said headband in association with two adjusting rods integral with the main body portions.

It is a further object of the present invention to provide an inflight headset for civil aircraft of which the ear cushions can be rotated with respect to the perpendicular plane along the length of the headband by means of the slots of the adjusting rods in association with the projections of the headbands.

A better understanding of the present invention will be obtained by those skilled in the art when the following detailed description of the best modes contemplated for practicing the invention is read in conjunction with the accompanying drawings wherein like numerals refer to like or similar parts and in which:

BRIEF DESCRIPTION OF THE DRAWINGS

FIG. 1A is a perspective view of an inflight headset for civil aircraft according to the present invention;

FIG. 1B illustrates the construction of the adjusting rod shown in FIG. 1A;

FIG. 2 is a top view of FIG. 1;

FIG. 4B illustrates the adjusting rod shown in FIG. 4A;

DETAILED DESCRIPTION OF THE PREFERRED EMBODIMENT

Figure 3:
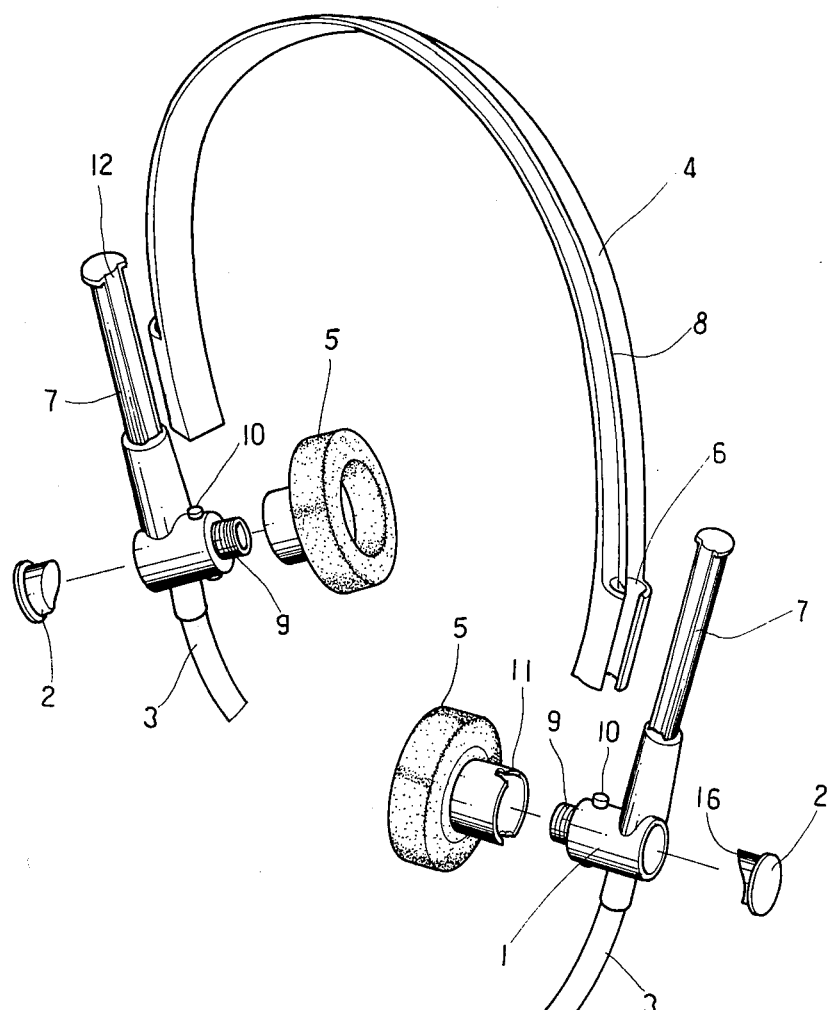
FIG. 3 is a fragmentary perspective view of the headset.

Referring to the drawings and in particular to FIG. 1 thereof, the inflight headset for civil aircraft according to the present invention comprises a pair of main body portions (1), a pair of covers (2), a pair of acoustic pipes (3), a pair of ear cushions (5) and a headband (4). The headband (4) is provided with a projection (8) along its length and two collars (6) made of elastic material. Each of the collars (6) is integrally made with one end of the headband (4). On the top of each main body portion (1) is an adjusting rod (7) which is closely fitted into the corresponding collar (6). Since the collars (6) are made of elastic material, each adjusting rod (7) may be regulated in height with respect to the corresponding collars (6). Each main body portion (1) is connected at one side with a cover (2) and at the opposite side with an ear cushion (5), and further connected at the lower part with an acoustic pipe (3) served for transmitting music or the like. The adjusting rod (7) positioned on the top of the main body portion (1) is provided with a slot (15) making an angle of 120° along its length. At the middle of the slot (15) is a protuberance (12) extending along the length of the slot (15), which will be in contact with the projection (8) when the adjusting rod (7) is fitted into the collar (6). The protuberance (12) is designed so that the adjusting rod (7) may be rotated through an angle of 90° in one direction and an angle of 30° in the opposite direction with respect to the perpendicular plane along the length of the headband (4), as shown in FIG. 2.

Figure 4A:
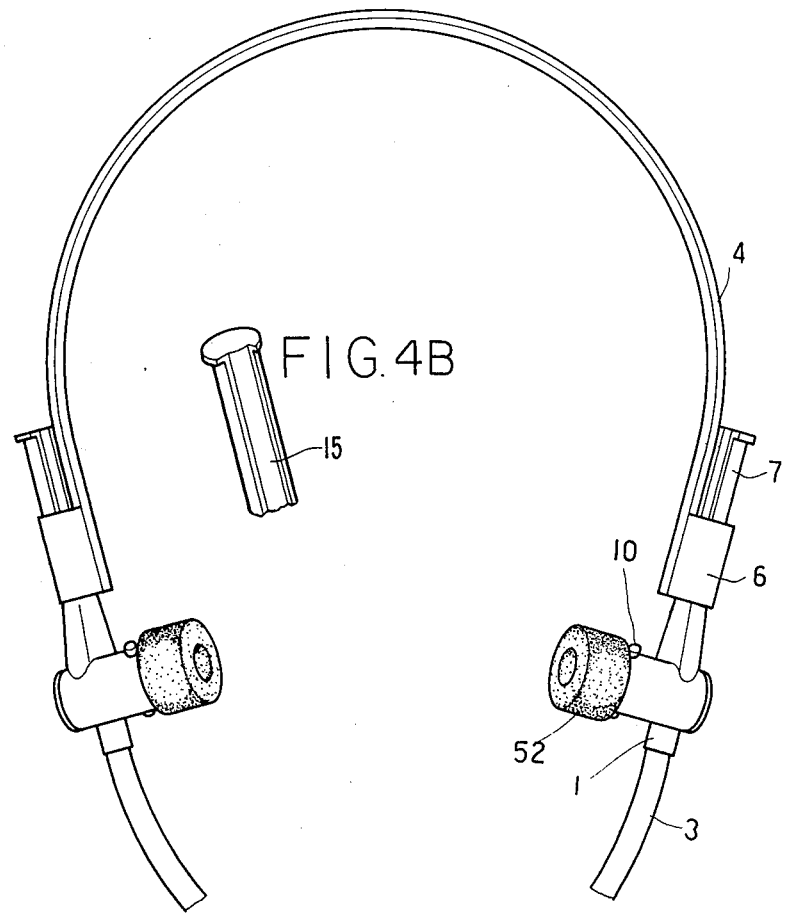
FIG. 4A is a perspective view of the headset with modified ear cushions.
Figures 5A, 5B:
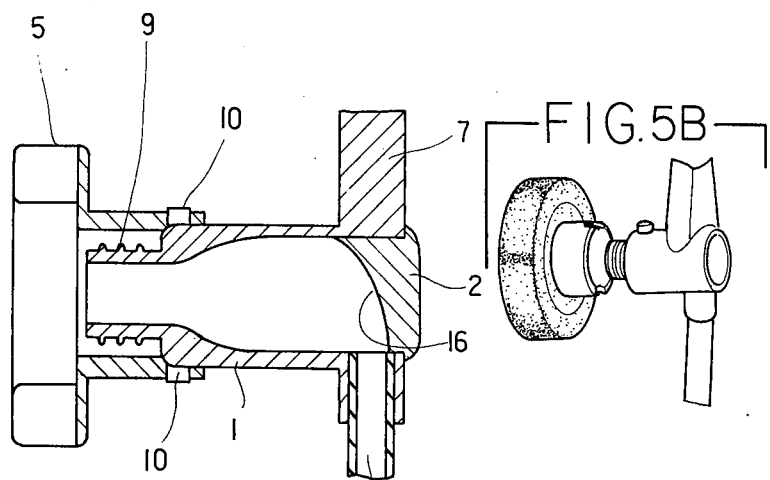
FIG. 5A shows in cross-sectional view the ear cushion of the present invention.
FIG. 5B shows the ear cushion of the present invention.
Figures 6A, 6B:
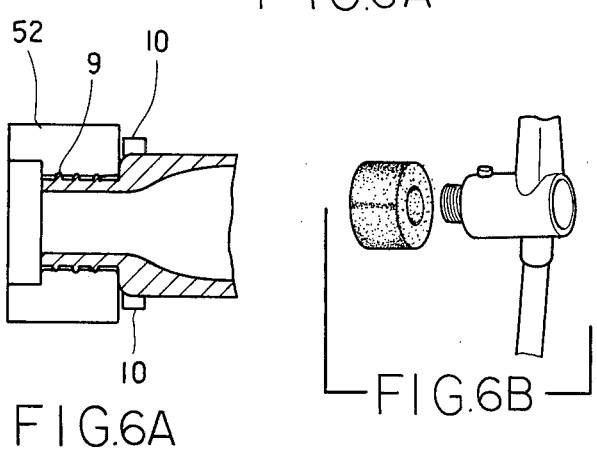
FIG. 6A shows in cross-sectional view a modified ear cushion of the present invention.
FIG. 6B shows the modified ear cushion of the present invention.

Referring to the drawings and particularly to FIG. 1, 5 and 6, with the outer side of the main body portion (1) is engaged the cover (2) which is possessed of a smoothly curved surface (16). As a result, the main body portion (1) in association with the cover (2) will have a very smooth passage, thereby faithfully transmitting the music or the like; furthermore, the cover (2) is directly connected to the main body portion (1) and this will facilitate the assembly and manufacture of the headset. The inner side of the main body portion is provided with two pins (10) and male screw threads (9). Each of the pins (10) is adapted to a notch (11) of the ear cushion (5); consequently, the ear cushion (5) may easily be mounted to or dismantled from the main body portion (1). If desired to use smaller ear cushion (52) (as shown in FIG. 6 and FIG. 4), it is just necessary to engage the ear cushion (52) with the male screw threads (19) of the main body portion (1).

As stated, the inflight headset according to the present invention may satisfactorily receive the music or the like and may be equipped with ear cushions of different sizes as well, and thus is especially suitable for use in civil aircrafts.

Although this invention has been described with a certain degree of particularity, it is understood that the present disclosure has been made by way of example only and that numerous changes in the detail of construction and the arrangement and combination of parts may be resorted to without departing from the scope and spirit of the invention as hereinafter claimed.

I claim:

1. An inflight headset for civil aircraft comprising:
    a pair of main body portions each having an adjusting rod, said adjusting rod being provided with a slot along its length, said slot being provided with a protuberance along the length of said slot;

a pair of covers each connected to one of said main body portions;

a headband each end of which is provided with a collar, said collar being closely fitted with said adjusting rod in a way such that said adjusting rod may be regulated in height with respect to said collar, said headband further having a projection along its length, said projection being associated with said protuberance in such a manner that said adjusting rod may be rotated with respect to the perpendicular plane along the length of said headband;

a pair of ear cushions each connected with one of said main body portions; and a pair of acoustic pipes each connected to one of said main body portions.

2. An inflight headset for civil aircraft as claimed in claim 1, wherein said collars are made of elastic material.

3. An inflight headset for civil aircraft as claimed in claim 1, wherein said cover is possessed of a smoothly curved surface so that a very smooth passage can be obtained when said cover is engaged with said main body portion.

4. An inflight headset for civil aircraft as claimed in claim 1, wherein each said main body portion is provided with two pins and screw threads.

5. An inflight headset for civil aircraft as claimed in claim 4, wherein each said ear cushion is provided with two notches, said notches being to engage said pins when said ear cushion is connected with said main body portion.

6. An inflight headset for civil aircraft as claimed in claim 1, wherein each said ear cushion is threadedly engaged with each said main body portion.

* * * * *